US010151938B2

(12) United States Patent
Jung et al.

(10) Patent No.: US 10,151,938 B2
(45) Date of Patent: Dec. 11, 2018

(54) DISPLAY DEVICE

(71) Applicant: SAMSUNG ELECTRONICS CO., LTD., Suwon-si (KR)

(72) Inventors: Sung Soo Jung, Suwon-si (KR); Woo Young Kan, Seongnam-si (KR); Sang Hak Kim, Yongin-si (KR); Doo Soon Park, Yongin-si (KR); Hyun Jun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 409 days.

(21) Appl. No.: 13/728,452

(22) Filed: Dec. 27, 2012

(65) Prior Publication Data

US 2013/0170115 A1    Jul. 4, 2013

(30) Foreign Application Priority Data

Dec. 30, 2011    (KR) .................. 10-2011-0147720

(51) Int. Cl.
| | |
|---|---|
| *G02F 1/00* | (2006.01) |
| *G02F 1/1333* | (2006.01) |
| *G02F 1/1335* | (2006.01) |
| *G02F 1/1345* | (2006.01) |

(52) U.S. Cl.
CPC .............. *G02F 1/00* (2013.01); *G02F 1/1345* (2013.01); *G02F 1/133308* (2013.01); *G02F 1/133512* (2013.01); *G02F 2001/133388* (2013.01)

(58) Field of Classification Search
CPC ..... G02F 1/00; G02F 1/1345; G02F 1/133512
See application file for complete search history.

(56) References Cited

U.S. PATENT DOCUMENTS

| 5,666,177 | A | * | 9/1997 | Hsieh | ................. | G02F 1/133512 |
| | | | | | | 349/106 |
| 5,666,261 | A | * | 9/1997 | Aguilera | ................. | 361/679.09 |
| 6,072,556 | A | * | 6/2000 | Hirakata et al. | ............... | 349/153 |
| 6,342,932 | B1 | * | 1/2002 | Terao | ................. | G02F 1/13452 |
| | | | | | | 349/150 |
| 6,532,152 | B1 | * | 3/2003 | White | ............... | G02F 1/133308 |
| | | | | | | 312/223.1 |

(Continued)

FOREIGN PATENT DOCUMENTS

| JP | 3991656 B2 | 10/2007 |
| KR | 10-2010-0105260 A | 9/2010 |
| KR | 10-2011-0032110 A | 3/2011 |

OTHER PUBLICATIONS

Communication issued Apr. 19, 2018, issued by the Korean Intellectual Property Office in counterpart Korean Patent Application No. 10-2011-0147720.

*Primary Examiner* — David M Sinclair
*Assistant Examiner* — Robert Brown
(74) *Attorney, Agent, or Firm* — Sughrue Mion, PLLC

(57) ABSTRACT

A display device including a display panel having an active area to display an image, and an inactive area provided with a pattern disposed thereto to apply an electrical signal to the active area, a side cover having a peripheral frame disposed at an outer portion of the display panel to form a side portion exterior of the display device, and a support frame extended from the peripheral frame to be disposed at a rear of the display panel and supporting the display panel, and a black matrix disposed at a front of the inactive area to hide a pattern of the inactive area.

54 Claims, 16 Drawing Sheets

(56) References Cited

U.S. PATENT DOCUMENTS

| | | | |
|---|---|---|---|
| 6,560,124 B1* | 5/2003 | Irie et al. | 361/816 |
| 6,611,302 B1* | 8/2003 | Ueda et al. | 349/58 |
| 6,853,409 B2* | 2/2005 | Takeishi | 349/58 |
| 7,310,222 B2* | 12/2007 | Bovio et al. | 361/679.27 |
| 8,575,735 B2* | 11/2013 | Cho | H01L 23/4985 257/676 |
| 8,947,617 B2 | 2/2015 | Jung et al. | 349/62 |
| 2004/0246397 A1* | 12/2004 | Kang et al. | 349/58 |
| 2005/0135724 A1* | 6/2005 | Helvajian et al. | 385/14 |
| 2006/0098152 A1* | 5/2006 | Park | H04N 5/64 349/149 |
| 2006/0104023 A1* | 5/2006 | Lee | G06F 1/20 361/679.48 |
| 2007/0079537 A1* | 4/2007 | Lee | 40/750 |
| 2007/0229731 A1* | 10/2007 | Lan et al. | 349/64 |
| 2008/0035811 A1* | 2/2008 | Kim | F16M 11/08 248/205.1 |
| 2008/0055834 A1* | 3/2008 | Matsuzaki et al. | 361/681 |
| 2008/0225204 A1* | 9/2008 | Mishima | G02F 1/13452 349/65 |
| 2008/0291383 A1* | 11/2008 | Ku et al. | 349/153 |
| 2008/0297999 A1* | 12/2008 | Choi | 361/681 |
| 2009/0002623 A1* | 1/2009 | Oda et al. | 349/147 |
| 2009/0009680 A1* | 1/2009 | Zensai | 349/63 |
| 2009/0073675 A1* | 3/2009 | Takata | 362/97.1 |
| 2009/0079904 A1* | 3/2009 | Yada et al. | 349/60 |
| 2009/0115928 A1* | 5/2009 | Shin | 349/58 |
| 2009/0115931 A1* | 5/2009 | Yoo | 349/58 |
| 2009/0167171 A1* | 7/2009 | Jung | H01L 51/524 313/504 |
| 2009/0168319 A1* | 7/2009 | Jeon et al. | 361/679.22 |
| 2009/0180049 A1* | 7/2009 | Lee et al. | 349/58 |
| 2009/0185341 A1* | 7/2009 | Jang et al. | 361/679.22 |
| 2009/0207102 A1* | 8/2009 | Choi | 345/58 |
| 2009/0207327 A1* | 8/2009 | Terao et al. | 349/5 |
| 2009/0207334 A1* | 8/2009 | Kim et al. | 349/58 |
| 2009/0213292 A1* | 8/2009 | Park et al. | 349/58 |
| 2009/0231506 A1* | 9/2009 | Takata | 349/58 |
| 2009/0231509 A1* | 9/2009 | Hsu et al. | 349/60 |
| 2009/0262275 A1* | 10/2009 | Kang et al. | 349/58 |
| 2009/0262554 A1* | 10/2009 | Lee et al. | 362/633 |
| 2009/0289880 A1* | 11/2009 | Byoun et al. | 345/87 |
| 2009/0290327 A1* | 11/2009 | Kim et al. | 362/97.1 |
| 2010/0038117 A1* | 2/2010 | Chung | H01L 23/4985 174/254 |
| 2010/0053912 A1* | 3/2010 | Harita | 361/752 |
| 2010/0060601 A1* | 3/2010 | Oohira | G02F 1/133308 345/173 |
| 2010/0073582 A1* | 3/2010 | Konno et al. | 348/794 |
| 2010/0079942 A1* | 4/2010 | Yamamoto et al. | 361/690 |
| 2010/0118250 A1* | 5/2010 | Fujikawa | 349/139 |
| 2010/0123864 A1* | 5/2010 | Sugiyama et al. | 349/138 |
| 2010/0165233 A1* | 7/2010 | Jung | 349/58 |
| 2010/0165235 A1* | 7/2010 | Lee et al. | 349/58 |
| 2010/0165237 A1* | 7/2010 | Jung | 349/58 |
| 2010/0165244 A1* | 7/2010 | Shin et al. | 349/62 |
| 2010/0165253 A1* | 7/2010 | Jung et al. | 349/65 |
| 2010/0171897 A1* | 7/2010 | Yun et al. | 349/58 |
| 2010/0177259 A1* | 7/2010 | Ichioka et al. | 349/58 |
| 2010/0188596 A1* | 7/2010 | Juan et al. | 349/58 |
| 2010/0188607 A1* | 7/2010 | Park et al. | 349/62 |
| 2010/0238365 A1* | 9/2010 | Hisakawa | 349/11 |
| 2010/0253874 A1* | 10/2010 | Ito et al. | 349/58 |
| 2010/0259488 A1* | 10/2010 | Larsen et al. | 345/173 |
| 2010/0259881 A1* | 10/2010 | Choi et al. | 361/679.21 |
| 2010/0265430 A1* | 10/2010 | Xu | 349/58 |
| 2010/0271568 A1* | 10/2010 | Jung et al. | 349/65 |
| 2010/0283935 A1* | 11/2010 | Park et al. | 349/58 |
| 2010/0309102 A1* | 12/2010 | Jung | 345/82 |
| 2010/0309406 A1* | 12/2010 | Kim et al. | 349/61 |
| 2010/0315570 A1* | 12/2010 | Mathew et al. | 349/58 |
| 2010/0328568 A1* | 12/2010 | Lee et al. | 349/58 |
| 2010/0328573 A1* | 12/2010 | Kim | 349/62 |
| 2010/0328862 A1* | 12/2010 | Wang et al. | 361/679.01 |
| 2011/0002112 A1* | 1/2011 | Hsu et al. | 361/829 |
| 2011/0018462 A1* | 1/2011 | Lowe et al. | 315/294 |
| 2011/0051348 A1* | 3/2011 | Song | 361/679.26 |
| 2011/0069055 A1* | 3/2011 | Jung et al. | 345/211 |
| 2011/0096569 A1* | 4/2011 | Hamada | 362/613 |
| 2011/0102701 A1* | 5/2011 | Teng et al. | 349/58 |
| 2011/0110046 A1* | 5/2011 | Itoh et al. | 361/709 |
| 2011/0116218 A1* | 5/2011 | Choi et al. | 361/679.01 |
| 2011/0122334 A1* | 5/2011 | Tang | 349/58 |
| 2011/0134346 A1* | 6/2011 | Hayashi et al. | 348/790 |
| 2011/0148869 A1* | 6/2011 | Choi et al. | 345/419 |
| 2011/0149198 A1* | 6/2011 | Kim | G02F 1/133308 349/58 |
| 2011/0157511 A1* | 6/2011 | Hsu et al. | 349/58 |
| 2011/0205454 A1* | 8/2011 | Kim et al. | 348/836 |
| 2011/0216485 A1* | 9/2011 | Kang et al. | 361/679.01 |
| 2011/0221677 A1* | 9/2011 | Cavacuiti et al. | 345/167 |
| 2011/0227848 A1* | 9/2011 | Furusawa | 345/173 |
| 2011/0234937 A1* | 9/2011 | Han et al. | 349/58 |
| 2011/0242438 A1* | 10/2011 | Mouri | 348/790 |
| 2011/0261282 A1* | 10/2011 | Jean et al. | 349/58 |
| 2011/0267556 A1* | 11/2011 | Nambo et al. | 349/58 |
| 2011/0267751 A1* | 11/2011 | Shimo et al. | 361/679.01 |
| 2011/0273631 A1* | 11/2011 | Hayashi | 348/790 |
| 2011/0273641 A1* | 11/2011 | Wakabayashi et al. | 349/58 |
| 2011/0298751 A1* | 12/2011 | Merel | 345/175 |
| 2012/0050639 A1* | 3/2012 | Kim et al. | 349/58 |
| 2012/0052214 A1* | 3/2012 | Tsai et al. | 427/558 |
| 2012/0224343 A1* | 9/2012 | Sato | 361/760 |
| 2012/0327328 A1* | 12/2012 | Kim | G02F 1/133308 349/59 |
| 2013/0170116 A1* | 7/2013 | In et al. | 361/679.01 |

* cited by examiner

DISPLAY DEVICE

CROSS-REFERENCE TO RELATED APPLICATION

This application claims the benefit of Korean Patent Application No. 2011-0147720, filed on Dec. 30, 2011 in the Korean Intellectual Property Office, the disclosure of which is incorporated herein by reference.

BACKGROUND

1. Field

Embodiments of the present disclosure relate to a display device. More particularly, embodiments relate to a display device having a thin thickness.

2. Description of the Related Art

A flat panel display device, which replaces a cathode-ray tube display device, is being developed to achieve light weight, low power consumption, and a slim profile.

A flat display device may be divided into a light emitting type and a light receiving type. A light emitting type may include a Plasma Display Panel (PDP) and an Organic Light Emitting Diode (OLED). A light receiving type may include a Liquid Crystal Display (LCD).

A display device, which uses the Organic Light Emitting Diode, is superior in brightness and viewing angles in comparison to the Liquid Crystal Display. Further, the Display Device using the Organic Light Emitting Diode does not require a backlight unit, thereby accomplishing a slim profile.

SUMMARY

Therefore, it is an aspect of the present disclosure to provide a display device having an enhanced structure, capable of accomplishing a slim profile.

It is another aspect of the present disclosure to provide a display device, capable of preventing an exposure pattern or a terminal disposed at an inactive area of a display panel.

It is another aspect of the present disclosure to provide a display device that is easy to disassemble and assemble.

Additional aspects of the disclosure will be set forth in part in the following description. Therefore, additional aspects will be obvious from the description, or may be learned by practice of the disclosure.

In accordance with one aspect of the present disclosure, a display device includes a display panel, a side cover, and a black matrix. The display panel may have an active area to display an image, and an inactive area provided with a disposed pattern to apply an electrical signal to the active area. The side cover may have a peripheral frame, and a support frame. The peripheral frame may be disposed at an outer portion of the display panel to form a side portion exterior of the display device. The support frame may be extended from the peripheral frame to be disposed at a rear of the display panel and supporting the display panel. The black matrix may be disposed at a front of the inactive area to hide a pattern of the inactive area.

The side cover may include a heat conductor and may be formed in a rectangular shape.

The peripheral frame of the side cover may be formed such that a front surface of the display panel is entirely exposed.

The peripheral frame of the side cover may include a front surface peripheral frame disposed at a front of the black matrix to cover a portion of a front surface of the display panel.

A width of the black matrix may be larger than a width of the front surface peripheral frame such that at least one portion of the black matrix is exposed.

The black matrix may be disposed at a front surface of the display panel while corresponding to a position at which the pattern is formed.

The display device may further include a protective member disposed at a front of the display panel to protect the display panel. The black matrix may be disposed on at least one of a front or a rear of the protective member.

The protective member may include a plurality of layers having different material properties. The black matrix may be disposed in between the plurality of layers.

The peripheral frame of the side cover may include a first portion extended from the support frame toward a front, and a second portion extended from the support frame toward a rear.

The display device may further include a rear cover disposed at a rear of the display panel, disposed to form a rear portion exterior of the display device. The first portion of the peripheral frame may cover an outer side of a side surface of the display panel to prevent the side surface of the display panel from being exposed while the second portion of the peripheral frame covers an outer side of a side surface of the rear cover to prevent the side surface of the rear cover from being exposed.

The display device may further include a rear cover configured to support the support frame of the side cover and disposed to form a rear portion exterior of the display device.

The rear cover may be attached to the support frame of the side cover by use of an adhesive member.

The rear cover may include a tempered glass.

The display device may further include a middle panel disposed in between the display panel and the rear cover to reinforce the display panel.

The middle panel may perform heat emission.

The middle panel may be attached to a rear surface of the display panel by use of an adhesive member.

The display device may further include a bracket panel disposed in between the display panel and the rear cover. The bracket panel may include a first panel coupling portion disposed at an outer side of a side surface of the middle panel and attached to the display panel to reinforce the display panel, and a second panel coupling portion disposed in between the middle panel and the rear cover to be attached to the middle panel.

A part of the first panel coupling portion may be disposed in between the display panel and the support frame of the side cover and coupled to the support frame of the side cover.

The display device may further include a circuit board, disposed at a rear of the display panel, is electrically connected to the display panel. A space may be formed in between a part of the first panel coupling portion and the rear cover, while the circuit board is disposed in the space.

In accordance with another aspect of the present disclosure, a display device includes a display panel, a rear cover, a side cover and a black matrix. The display panel may have an active area to display an image, and an inactive area provided with a disposed pattern to apply an electrical signal to the active area. The rear cover may be disposed at a rear of the display panel to form a rear portion exterior of the display device. The side cover may have a peripheral frame disposed at outer portions of the display panel and the rear cover to form a side portion exterior of the display device, and a support frame extended from the peripheral frame to be disposed between the display panel and the rear cover. The black matrix may be disposed at a front of the inactive area to hide a pattern of the inactive area.

The display panel may be directly attached to a front surface of the support frame of the side cover by use of an adhesive member.

The display panel may be supported by the support frame of the side cover by use of at least one medium.

The rear cover may be attached to a rear surface of the support frame of the side cover by use of an adhesive member.

The rear cover may be fastened to at least one of the support frame of the side cover and the at least one medium.

The display device may further include a middle panel disposed in between the display panel and the rear cover to reinforce the display panel.

The display panel may include an organic light emitting diode panel.

The rear cover may include a cable accommodating guide formed to accommodate a cable configured to supply an electrical signal that is delivered to the display panel.

At least one printed circuit board is disposed at a rear side of the middle panel to supply an image signal and power to the display panel.

The display device may further include a supporter coupled to the rear cover to support the display panel.

In accordance with a further aspect of the present disclosure, a display device may include a display panel with an active area in which an image is displayed, and an inactive area in which an image is not displayed; a side cover including a peripheral frame to form an outer frame of the display device, and a support frame formed inside the peripheral frame; a rear cover disposed at a rear of the display panel; and a supporter fixed to the rear of the display panel to support the display panel.

As described above, a cover that forms an exterior of a display device as well as a panel and a board that are disposed at an inside the display device is disposed in a compacted manner. Therefore, the display device may accomplish a slim profile.

In addition, the display device, in accordance with the present disclosure, may prevent the pattern or the terminal unit of an inactive area of a display panel from being exposed to a user.

By use of a middle panel attached to the display panel, the display panel may be prevented from being damaged, while the heat generated from the display panel may be released.

By simplifying an assembly structure, in between a cover forming the exterior of the display device and an inside panel, productivity may be improved.

By forming a rear cover of the display device with material having a light weight and greater strength, a display device having a lower damage rate and superior exterior aspect may be manufactured.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
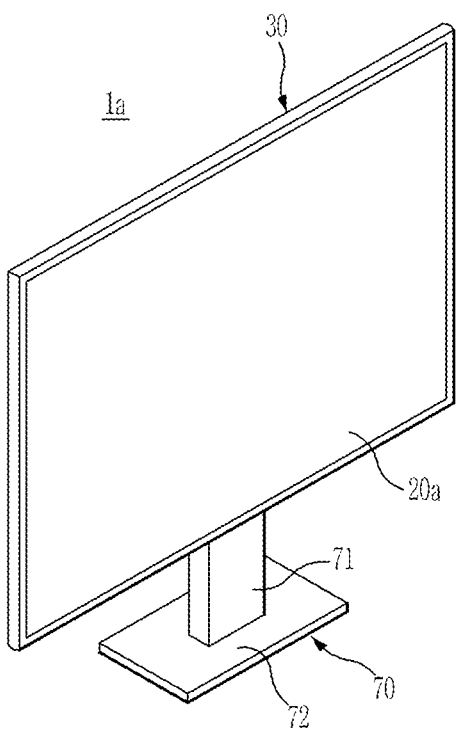
FIG. 1 is a drawing illustrating a front surface of a display device in accordance with an embodiment of the present disclosure.

Reference will now be made to the embodiments of the present disclosure. Examples of the embodiments are illustrated in the accompanying drawings, wherein like reference numerals refer to like elements throughout.

As illustrated on FIGS. 1 to 5, a display device 1a includes a display panel 20a and a side cover 30, forming a side portion exterior of the display panel 20a. A rear of the display panel 20a is provided with a rear cover 40, disposed to form a rear portion exterior of the display device 1a. A front surface of the display panel 20a may be provided with an attached film 10a.

Meanwhile, the display device 1a may be supported by a supporter 70. At this time, the supporter 70 may be fixed to a rear surface of the display device or to a lower end of the display device. In addition, the supporter 70 may be installed on a wall by a wall hanger apparatus (not shown) that uses a separate wire.

The display panel 20a, of the embodiment of the present disclosure, will be described on the basis of an organic light emitting diode panel. However, in addition to the organic light emitting diode panel, a liquid crystal display panel may be included as the display panel 20a of the present disclosure.

The display panel 20a is divided into an active area 21a, at which an image is displayed, and an inactive area 22, at which an image is not displayed.

The active area 21a is provided with a thin film transistor (not shown) formed. The thin film transistor is provided with a liquid crystal layer or an organic material layer, forming a pixel as an image displayed through an ON/OFF control of the thin film transistor.

In addition, the inactive area 22 is provided with a driving electrode pattern formed to drive the thin film transistor. and the driving electrode pattern, provided with a flexible circuit board electrically connected to supply data and power to the driving electrode pattern.

In order to display an image on the active area 21a of the display panel 20a, a pattern 22a is configured to authorize a signal to the thin film transistor of the display panel 20a, disposed at the inactive area 22a along the peripheral of the display panel 20a.

Figure 3:
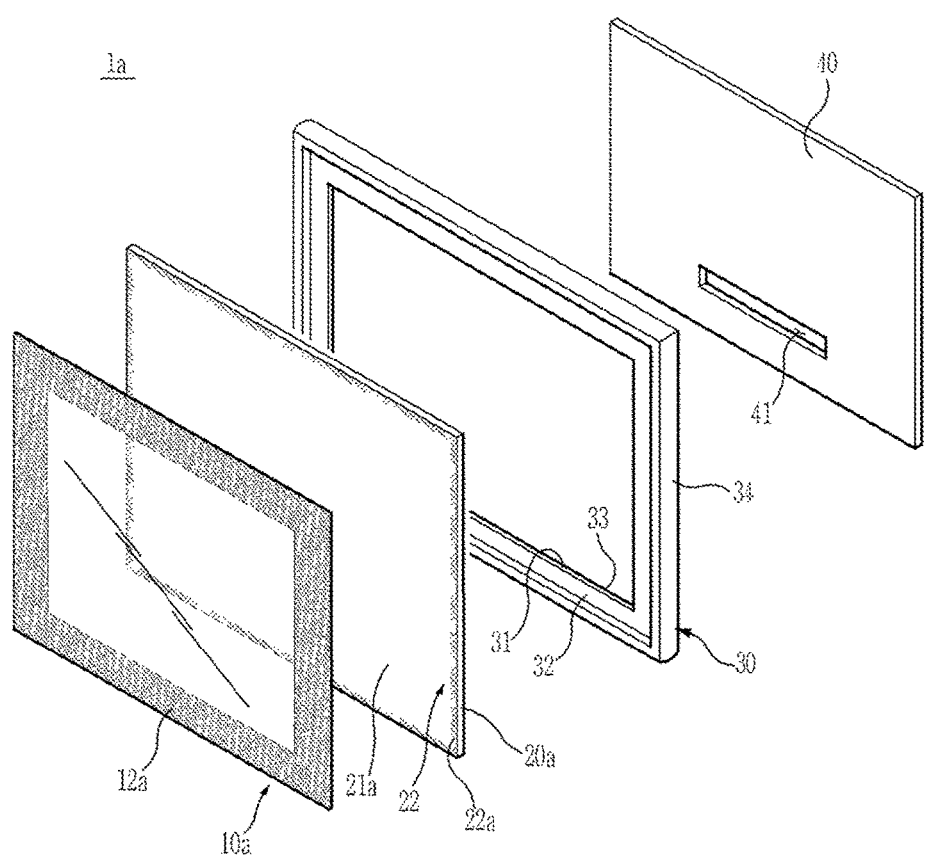
FIG. 3 is a perspective view illustrating a configuration of the display device of FIG. 1.
Figure 4:
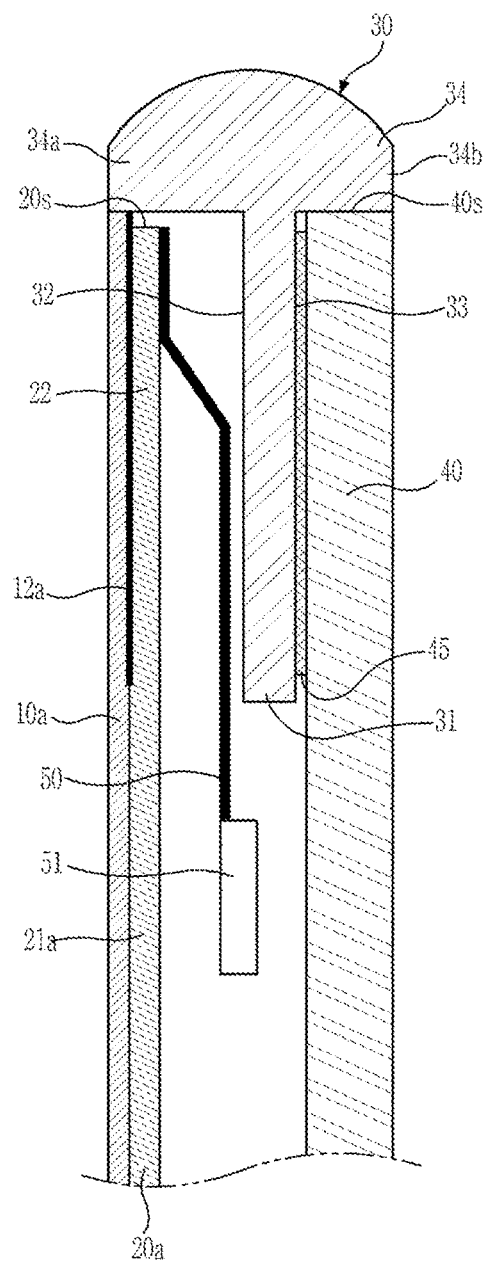
FIG. 4 is a cross-sectional view illustrating an upper portion of the display device of FIG. 1.
Figure 5:
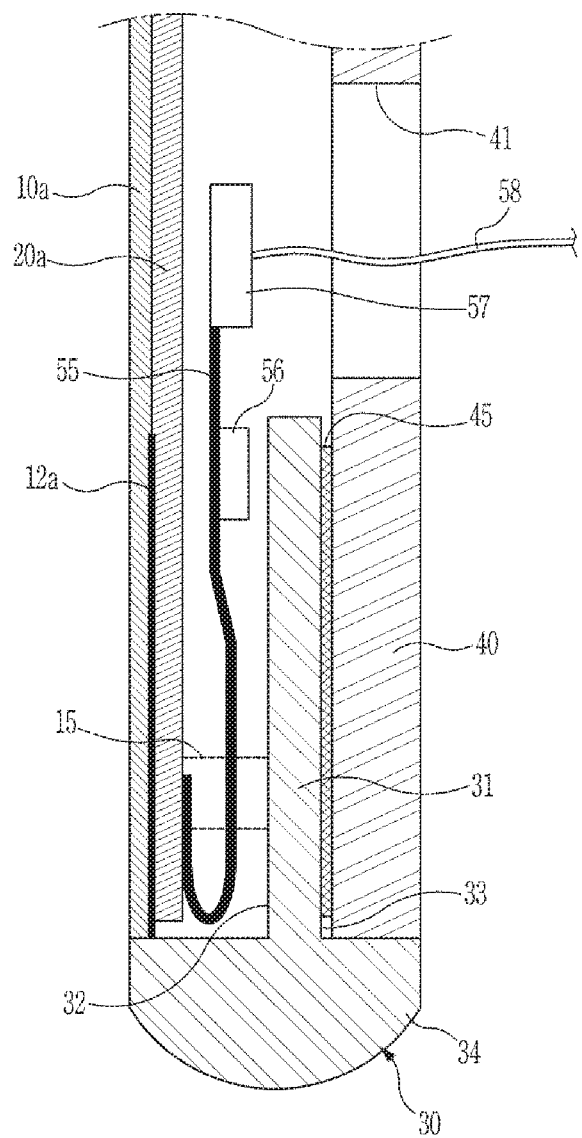
FIG. 5 is a cross-sectional view illustrating a lower portion of the display device of FIG. 1.

As illustrated on FIGS. 3 to 5, the display panel 20a may be supported at the side cover 30. The display panel 20a may be directly attached to and supported at the side cover 30. In addition, the display panel 20a may be indirectly supported at the side cover 30 by use of at least one medium.

The side cover 30 includes a peripheral unit 34, disposed at an outer portion of the display panel 20a to form a side portion exterior of the display device 1a, and a support unit 31, extendedly formed from the peripheral unit 34 to an inner side to be disposed at a rear of the display panel 20a.

The display panel 20a may be supported at a front surface 32 of the support unit 31, and a rear cover 40 may be supported at a rear surface 33 of the support unit 31.

The peripheral unit 34 of the side cover 30 may include a first portion 34a, extended from the support unit 31 toward a front, and a second portion 34b, extended from the support unit 31 toward a rear. The first portion 34a, of the peripheral unit 34, may be positioned to cover an outer side of the side of a side surface 20a of the display panel 20a so that the side surface 20s of the display panel 20a may not be exposed to a user, while the second portion 34b, of the peripheral unit 34, may be positioned to cover an outer side of a side surface 40s of the rear cover 40 so that the side surface 40s of the rear cover 40 may not be exposed to a user.

The peripheral unit 34 of the side cover 30 may be composed in a way that a front surface of the display panel 20a may be entirely exposed to a front of the display device 1a. In other words, the peripheral unit 34 may be composed to cover only the side surface 20s of the display panel 20a, while a front surface of the display panel 20a is not covered by the peripheral unit 34.

The side cover 30 may be composed with a heat conductor, and provided with a rectangular shape. The side cover 30 may be provided with a single member having each side of the peripheral unit 34 integrally formed. However, the side cover 30 may be provided in a way to separate the peripheral unit 34 into four pieces of rods, while corresponding to each side, and to assemble the four pieces of rods.

As illustrated on FIGS. 4 to 5, a front of the inactive area 22 of the display panel 20a is provided with a black matrix 12a, formed to cover the pattern 22a.

A front of the display panel 20a may be provided with a protective member, disposed to protect the display panel 20a. The protective member may be composed with a film 10a attached to a front of the display panel 20a. The film 10a, while performing a role to protect the display panel 20a, may be provided with polarization ability.

In other words, the film 10a may include a PVA layer configured to linear-polarize a penetrated light, a TAC layer configured to protect the PVA layer from an upper side of the PVA layer, and a COP layer. An adhesive layer may be formed at the lowest layer of the film 10a to attach the film 10a to the display panel.

The TAC layer is configured to protect the PVS layer, and may be formed with a TAC (tri-acetyl cellulose) having a phase difference of about 0.

The PVA layer is a layer configured to determine a characteristic of polarization, and is formed by stretching a PVA (poly-vinyl alcohol) having iodine or dyeing material dyed thereto.

The COP layer (120c) is formed by stretching a COP (cyclo-olefin polymer) film.

As illustrated on FIGS. 3 to 4, the black matrix 12a, corresponding to the position at which the pattern 22a is formed, may be formed at a rear of the film 10a. In addition, as illustrated on FIG. 6, the black matrix 12a may be formed at a front surface of the film 10a. In addition, as an another example, when the film 10a includes a plurality of layers having different material properties, the black matrix 12a may be provided in between two layers of the film 10a.

Figure 6:
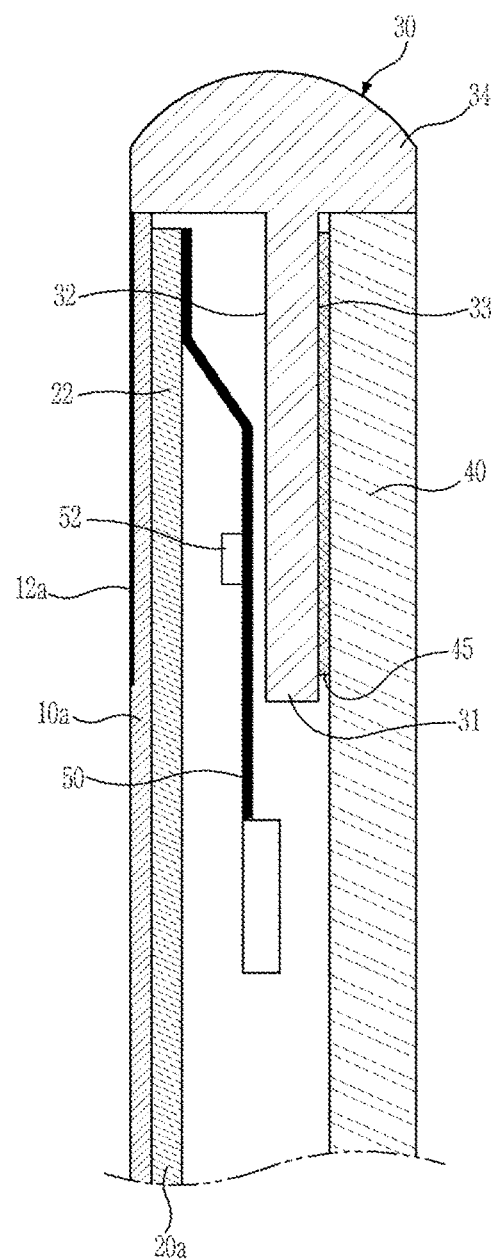
FIG. 6 is a cross-sectional view illustrating an alternative example of an upper portion of the display device of FIG. 1.

Referring to FIGS. 4 to 6, a width of the black matrix 12a is illustrated in an exaggerated manner. However, the width of the black matrix 12a is considered sufficient when having a width to cover the pattern disposed at the inactive area of the display panel.

The black matrix 12a may be formed at the film 10a through a printing method, while a method to cover the pattern 22a of the display panel 20a by darkening a portion of the film 10a may be included in the aspect of the present disclosure.

The rear cover 40 is mounted at the rear surface 33 of the support unit 31 of the side cover 30, to support the display panel 20a and the side cover 30.

The rear cover 40 may be provided with a cable accommodating unit to accommodate a cable. As illustrated on FIG. 3, the cable accommodating unit may be composed with a cable penetrating hole 41, adjacently formed to an edge of a lower end of the rear cover 40. In place of the penetrating hole, a portion of an edge may be eliminated such that the cable may be connected.

The cable penetrating hole 41, formed at the rear cover 40, is configured to provide a path for the cable to be extended to an outside the display device 1a. The cable is configured to supply power to a signal processing board, which generates an image signal being delivered to the display panel 20a, or to supply power to the display panel 20a, while the cable is connected to a power supplying board (not shown).

The rear cover 40 may be formed with material having higher strength. For example, the rear cover 40 may be formed with tempered glass.

The tempered glass is manufactured by heating a general glass, above a softening point, to modify the shape as desired and by rapidly cooling the glass by use of a compressed gas. When the glass is heated at high temperature and is rapidly cooled off, a compressed stress is formed on a surface layer and a tensile stress is formed at an inside.

Thus, the tempered glass is provided with high strength. Thus, the tempered glass provides a lower damage rate, and a superior heat tolerance. In addition, similar to a general glass, the tempered glass is provided with refined exterior, and the appearance is superior.

The rear cover 40 forms a rear exterior. When the tempered glass is used, the rear cover 40 is provided with a superior design, and high strength. Thus, the rear cover 40 is able to reduce the damage rate of the display device.

In addition, the rear cover 40 performs functions as a bottom chassis, onto which various boards are mounted. The tempered glass is provided with high strength, sufficiently protecting various boards.

The rear cover 40, composed with the tempered glass, may be formed in a transparent manner, as the glass is transparent, or the rear cover 40, composed with the tempered glass, may be formed in a non-transparent manner as a color is injected.

In addition, by considering heat conductivity, the rear cover 40 may be embodied with stainless or aluminum alloy having high heat conductivity. In other words, the rear cover 40, according to the present disclosure, is mounted at the support unit 31 of the side cover 30, and is formed with material to support the display panel 20a and the side cover 30.

Figure 2:
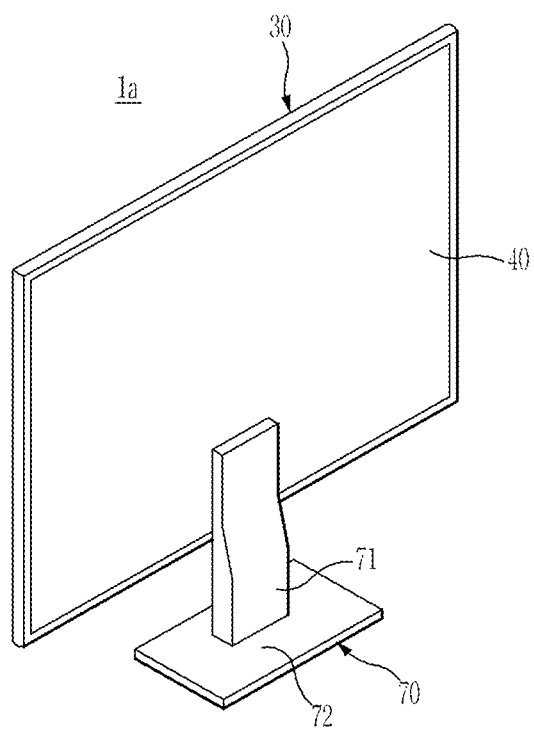
FIG. 2 is a drawing illustrating a rear surface of the display device of FIG. 1.

As illustrated on FIGS. 1 to 2, the supporter 70 supports the display device 1a, composed of a base 72 and a leg unit 71, extendedly formed from the base 72 toward an upper side.

One end of the leg unit 71 is connected to the base 72, and an opposite end of the leg unit 71 is fixed to a rear surface of the rear cover 40, while a portion may cover the cable penetrating hole 41 of the rear cover 40. In addition, the cable penetrated through the cable penetrating hole 41 of the rear cover 40, may be connected to a main board at which a connector, provided inside the leg unit 71, may be installed.

As illustrated on FIG. 4, the rear cover 40 may be attached to the rear surface 33 of the support unit 31 by use of an adhesive member 45. The adhesive member 45 may be composed with a double-side tape, and an other member may adhesively couple the rear cover 40 to the support unit 31 by use of an adhesive strength.

The display panel 20a and the front surface 32 of the support unit 31 may be disposed, while being spaced apart from each other. Although not illustrated, the display panel 20a may be attached to the front surface 32 of the support unit 31 by use of the adhesive member. However, a rear of the display panel 20a is provided with a space for electrical components to be disposed, such that the electrical components may drive the display panel 20a, the adhesive member having a predetermined thickness, such as a foam sponge may be used, while the display panel 20a may be attached to the front surface 32 of the support unit 31 by use of a double-sided tape having a thicker thickness compared to a double-sided tape.

The display panel 20a and the rear cover 40 may be coupled by use of only the side cover 30 and the adhesive member 45. A separate structure, provided for a coupling member, may be minimized. Therefore, a manufacturing process of the display panel may be simplified.

A rear of the display panel 20a may be provided with a mounted flexible connection film 50.

The flexible connection film 50 may be in the form of a TCP (Tape Carrier Package) using a TAB (Tape Automated Bonding) technology or a COF (Chip-On-Film) provided with a chip device on a base film.

The TCP, among the flexible connection film 50, is provided with a structure having a metallic conductive layer inserted in a single layer or in multiple layers in between flexible material layers such as polyamide, and a driving integrated circuit configured to authorize a driving signal for the thin film transistor is mounted to the TCP.

A middle portion of the flexible connection film 50 is provided with a mounted chip 52, and one end of the flexible connection film 50 is provided with a mounted printed circuit board 51.

As illustrated on FIG. 5, a rear surface of the display panel 20a may be provided with a flexible film 55 connected. The TCP is a type of a tape that may be flexibly bent. Thus, the flexible film 55 is bent and connected to a rear of the display panel 20a.

One end portion of the flexible film 55 is connected with a driving integrated circuit 57. A middle portion of the flexible film 55 is provided with a mounted chip 56.

The display panel 20a may be attached to the support unit 31 of the side cover 30 by use of an adhesive member 15, having a predetermined thickness such as a foam sponge or a thick double-sided tape.

The display device 1a, according to the embodiment of the present disclosure, is provided with the rear cover 40 configured to perform a function of a bottom chassis at which a board that processes and delivers an image signal is mounted.

Figure 7:
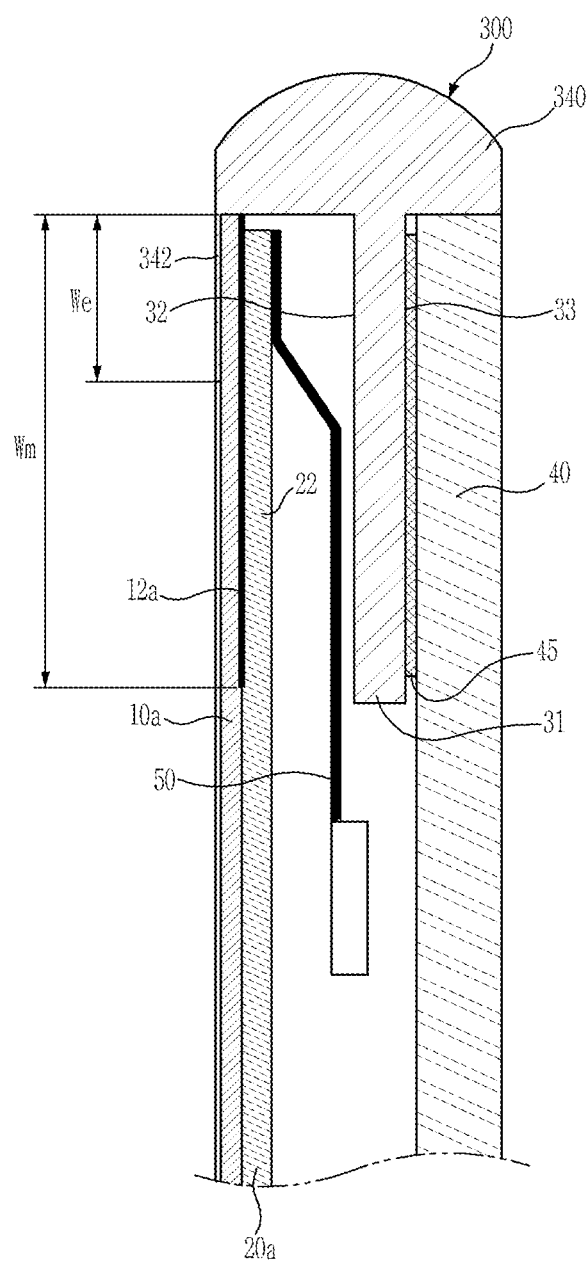
FIG. 7 is a drawing illustrating the display device of FIG. 1, provided with a peripheral unit of a side cover having a front surface peripheral unit.

As illustrated on FIG. 7, a peripheral unit 340 of a side cover 300 may include a front surface peripheral unit 342, disposed to cover a portion of a front surface of the display panel 20a. The front surface peripheral unit 342 may be integrally structured with another portion of the side cover 300, or may be assembled to the peripheral unit 340, as the front surface peripheral unit 342 is provided as a separate member.

The black matrix 12a is provided in between the front surface peripheral unit 342 and the display panel 20a, to cover a pattern or a terminal disposed at the inactive area 22. A width Wm of the black matrix 12a may be formed to be greater than a width We of the front surface peripheral unit 342, such that at least a portion of the black matrix 12a may be exposed to a front of the display device.

A front of the display panel 20a may be provided with the film 10a disposed, to protect the display panel 20a, and the black matrix 12a may be printed either on a front surface or a rear surface of the film 10a. Referring to FIG. 7, the black matrix 12a is illustrated to be printed on a rear surface of the film 10a. As another example, the black matrix, in order to cover the inactive area of the display panel 20a, may be directly printed on the display panel 20a.

Figure 8:
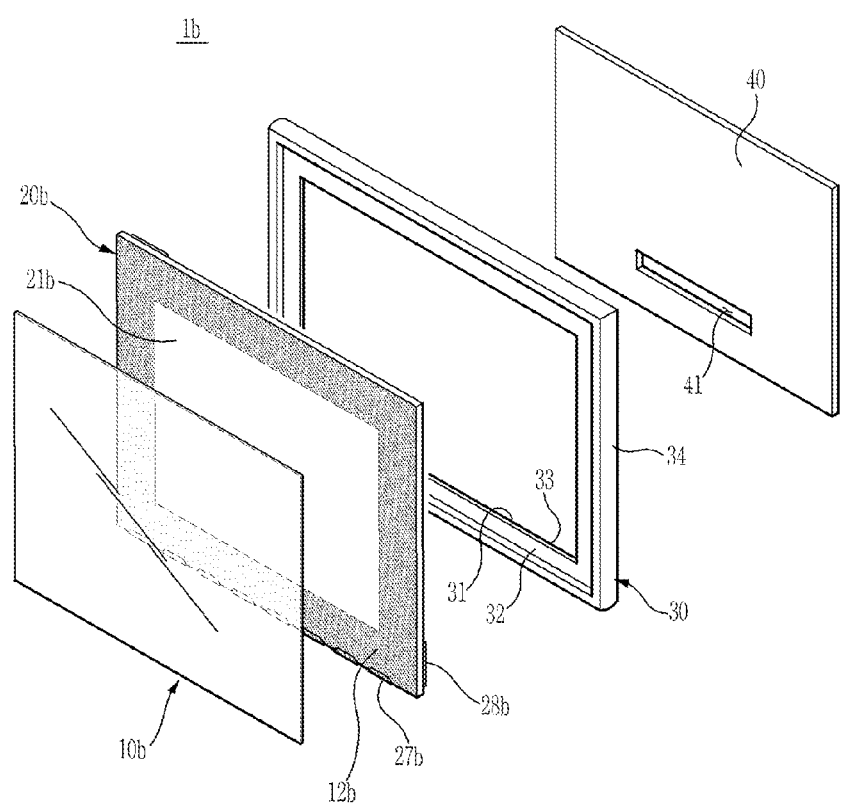
FIG. 8 is a perspective view illustrating a configuration of a display device, in accordance with another embodiment of the present disclosure.
Figure 9:
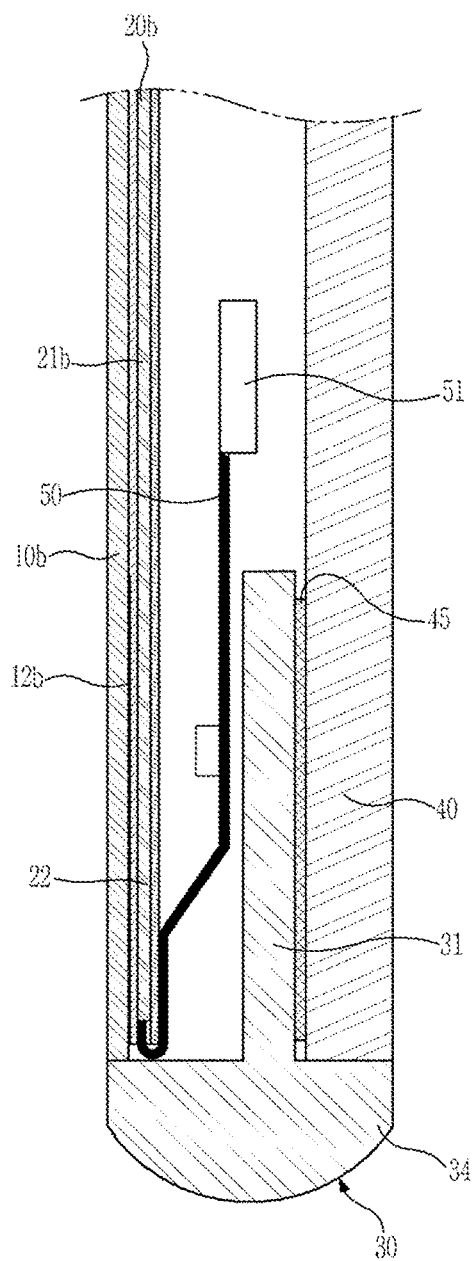
FIG. 9 is a cross-sectional view illustrating a lower portion of the display device of FIG. 8.

FIGS. 8 to 9 are drawings illustrating a structure of a display device according to another embodiment of the present disclosure.

As illustrated on FIGS. 8 to 9, a display device 1b includes a display panel 20b, the side cover 30 configured to wrap around a side surface peripheral of the display panel 20b, the rear cover 40 forming a rear exterior of the display device 1b, and a film 10b attached to a front surface of the display panel 20b.

The side cover 30 includes the peripheral unit 34 and the support unit 31, extendedly formed from the peripheral unit 34 toward an inner side. The display panel 20b is directly and indirectly supported at the front surface 32 of the support unit 31, and the rear cover 40 may be attached to the rear surface 33 of the support unit 31.

The display panel 20b includes an active area 21b, at which an image is displayed, and the inactive area 22, at which an image is not displayed. The inactive area 22, of the display panel 20b, is provided with a pattern (not shown) disposed to authorize an electrical signal to the active area 21b.

As illustrated on FIG. 9, the black matrix 12b may be formed on the display panel 20b by corresponding to the position at which the pattern is formed.

The black matrix 12b may be formed on a front surface of the display panel 20b through a printing.

Other than the printing, a method of darkening a portion of the display panel 20b to cover the pattern (not shown) may be included in the aspect of the present disclosure.

The display panel 20b may be provided with a structure having a cell, in a form of a liquid crystal, inserted in between two sheets of boards. An electrode is protruded at the cell, in between a front board and a rear board, and the electrode is connected to the flexible connection film 50. One end portion of the flexible connection film 50 is provided with the mounted printed circuit board 51.

Figure 10:
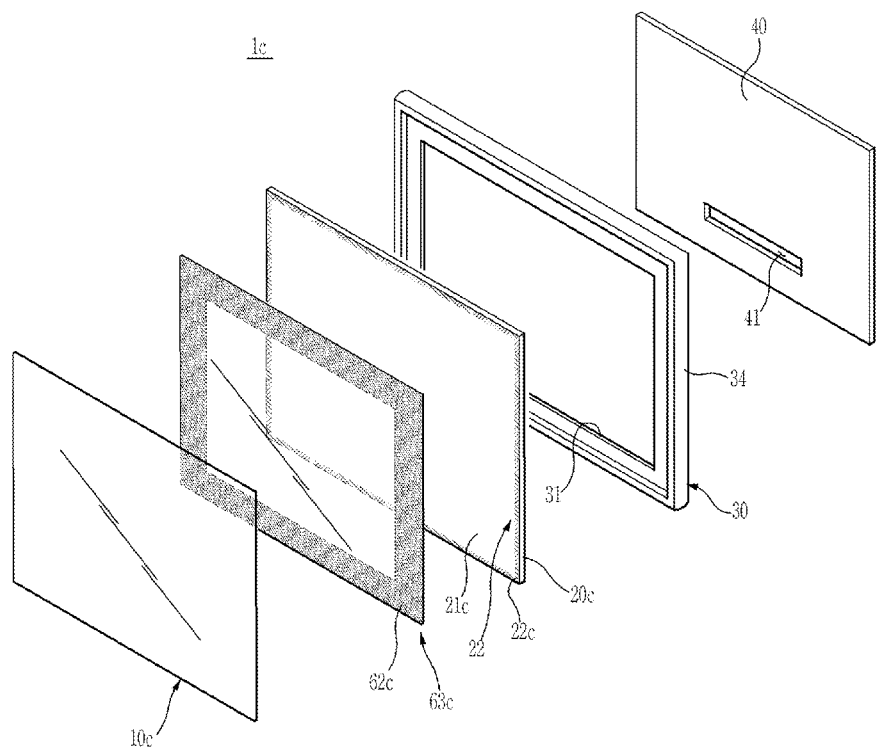
FIG. 10 is a perspective view illustrating a configuration of a display device, in accordance with another embodiment of the present disclosure.

FIG. 10 is a perspective view illustrating a configuration of a display device in accordance with another embodiment of the present disclosure.

As illustrated on FIG. 10, a display device 1c includes a display panel 21c, the side cover 30 configured to wrap around a side surface peripheral of the display panel 20c, the rear cover 40 forming a rear exterior of the display device, a protective glass board 63c disposed at a front surface of the display panel 20c to protect the display panel 20c, and a film 10c attached to a front surface of the protective glass board 63c.

The side cover 30 includes the peripheral unit 34 and the support unit 31, extendedly formed from the peripheral unit 34 toward an inner side. The display panel 20c includes an active area 21c, at which an image is displayed, and the inactive area 22, at which an image is not displayed. The inactive area 22, of the display panel 20c, is provided with a pattern 22c disposed to authorize an electrical signal to the active area 21c.

A black matrix 62c may be formed on the protective glass board 63c, to cover the pattern 22c of the display panel 20c. The black matrix 62c may be formed through a printing, either on a front surface or a rear surface of the protective glass board 63c, or other than the printing, a method of darkening a portion of the peripheral of the protective glass board 63c to cover the pattern 22c.

The film 10c may be attached to a front surface of the protective glass board 63c at which the black matrix 62c is formed. The embodiment of the present disclosure may be applied when a black matrix may not be appropriate to be formed on the film 10c or on the display panel 20c. For example, when a protruded portion, which is on a front surface of the display panel 20c, may not be covered by a black matrix formed on the display panel 20c, or when the film 10c is protruded as a result of the portion protruded even with the film 10c is attached thereon, the embodiment of the present disclosure may be used.

Figure 11:
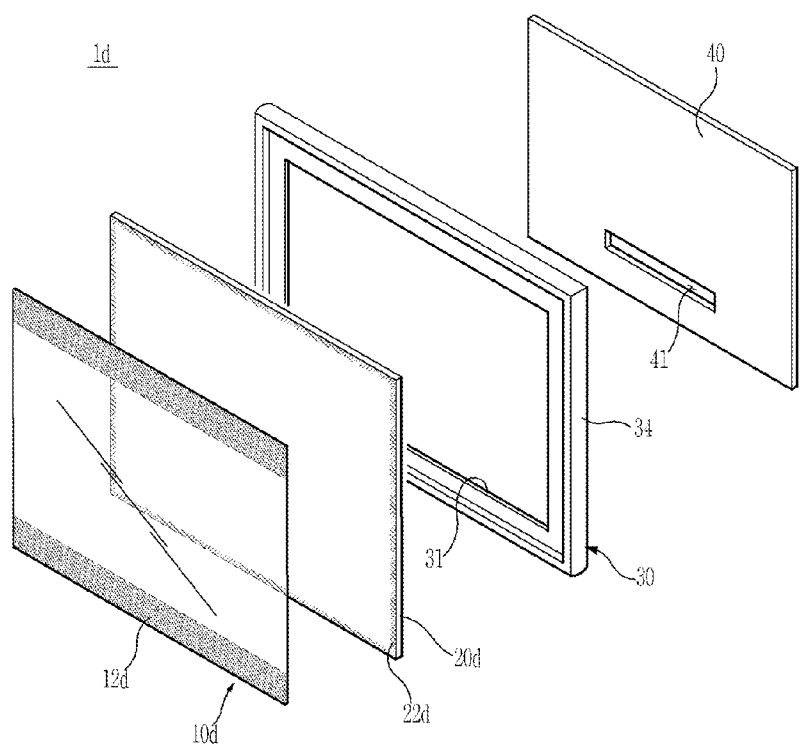
FIG. 11 is a perspective view illustrating a configuration of a display device, in accordance with another embodiment of the present disclosure.

FIG. 11 is a perspective view illustrating a configuration of a display device in accordance with another embodiment of the present disclosure.

As illustrated on FIG. 11, a film 10d is provided with a black matrix 12d formed thereto. The black matrix 12d is only formed at an upper side peripheral and a lower side peripheral of the four peripherals.

The display panel 20d and a pattern 22d may only be formed at an upper side and a lower side of the display panel 20d. The black matrix 12d, which is configured to cover such, is also formed only at the upper side and the lower side of the display panel 20d.

According to the embodiment of the present disclosure, the pattern 22d is formed only at one side peripheral of the display panel 20d, while the black matrix 12d also is formed only at one side peripheral of the display panel 20d.

Figure 12:
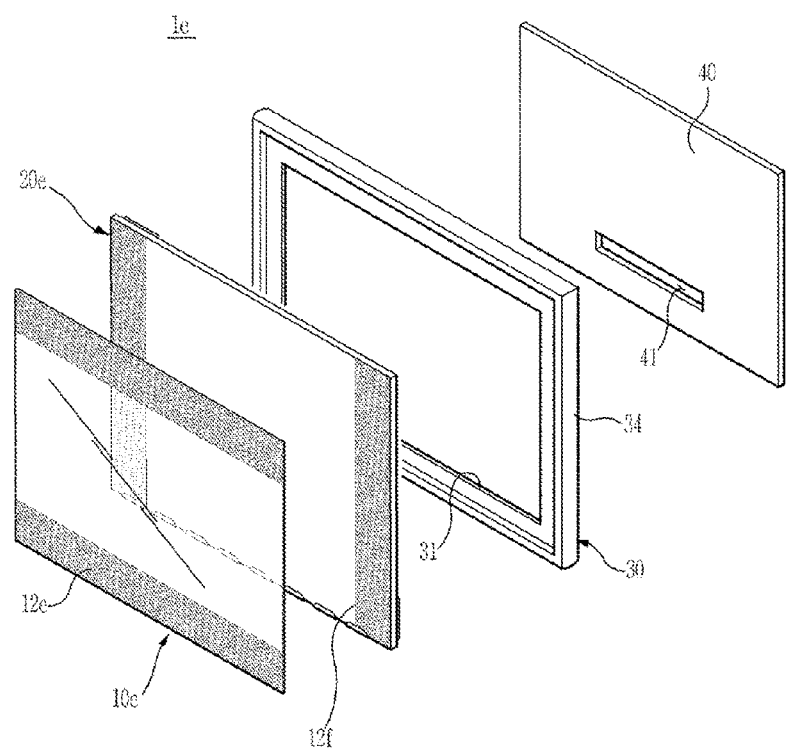
FIG. 12 is a perspective view illustrating a configuration of a display device, in accordance with another embodiment of the present disclosure.
Figure 13:
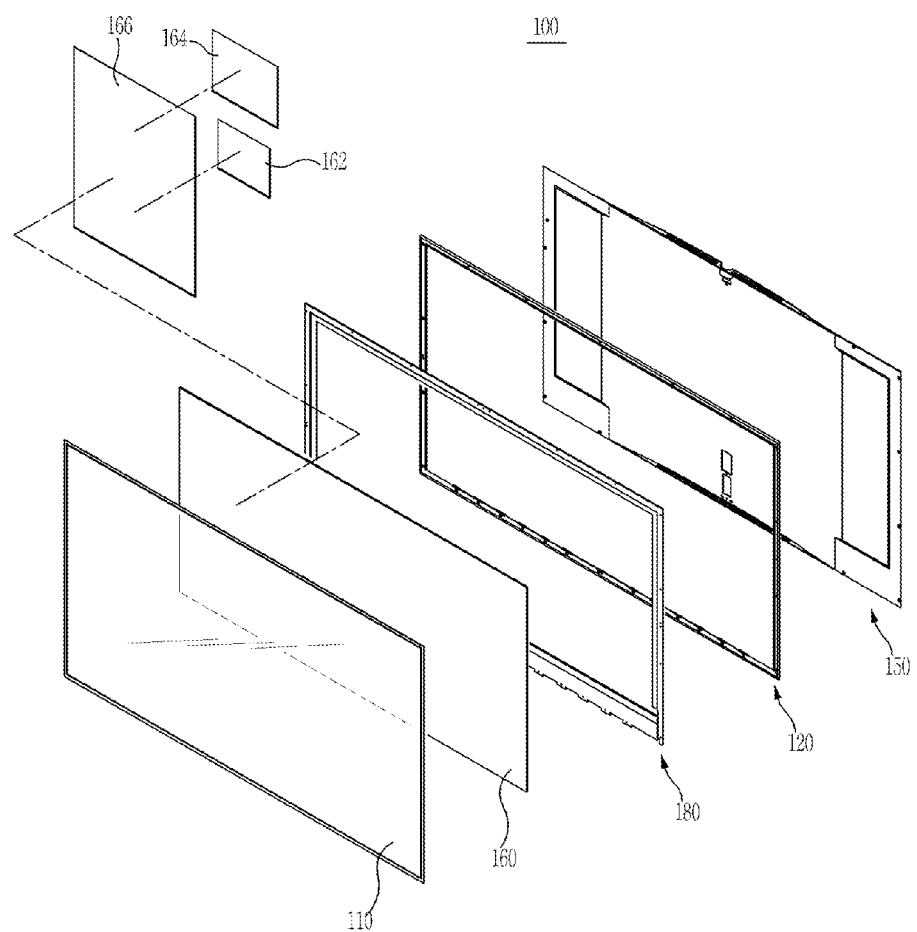
FIG. 13 is a perspective view illustrating a display device, in accordance with another embodiment of the present disclosure.

FIG. 12 is a perspective view, illustrating a configuration of a display device, in accordance with another embodiment of the present disclosure.

As illustrated on FIG. 12, black matrixes 12e and 12f are formed such that the entire four peripherals of a display panel 20e may be covered.

The black matrixes 12f, positioned at a left peripheral and a right peripheral, are formed on the display panel 20e. The black matrixes 12e positioned at an upper peripheral and a lower peripheral are formed on a film 10e.

As the film 10e is adhesively attached to the display panel 20e, the black matrixes 12e and 12f may be able to cover the entire patterns formed at the four peripherals of the display panel 20e.

The black matrixes, being positioned at the left side peripheral and the right side peripheral, are formed on the film 10e, and the black matrixes, being positioned at the upper side peripheral and the lower side peripheral, are formed on the display panel 20e.

FIGS. 13 to 16 are drawings illustrating a structure of a display device in accordance with another embodiment of the present disclosure. The display device is illustrated on FIG. 13, while a film is omitted.

As illustrated on FIGS. 13 to 16, a display device 100 includes a display panel 110 and a side cover 120, disposed to form a side surface exterior of the display device 100.

The display panel 110 is provided with an active area 112, composed to display an image, and an inactive area 114, being positioned at an outer portion of the active area 112 and at which an image is not being displayed. The inactive area 114 is provided with a pattern 115, formed to authorize an electrical signal to the active area 112.

The side cover 120 is disposed at an outer side of a side surface 110s of the display panel 110, and includes a peripheral unit 122 forming an exterior of the display device 100, and a support unit 124 extended from the peripheral unit 122 to be disposed at a rear of the display panel 110.

The display panel 110 may be directly supported by being attached to the support unit 124, or may be supported at the support unit 124 by using at least one structure as a medium.

A front of the inactive area 114 of the display panel 110 is provided with a black matrix 130 to cover the pattern 115 of the inactive area 114. Referring to FIGS. 13 to 16, a front of the display panel 110 is provided with a disposed film 140, and a front of the film 140 is provided with the black matrix 130 formed. However, the black matrix 130 may be formed in between a front surface of the film 140 and a front surface of the display panel 110. In addition, the black matrix 130 may be formed at a front of the display panel 110.

A rear of the support unit 124, of the side cover 120, may be provided with a rear cover 150 to form a rear surface exterior of the display device 100, and a middle panel 160, may be provided in between the display panel 110 and the rear cover 150, to reinforce the display panel 110.

The middle panel 160, in order to prevent the display panel 110 from being deformed or damaged, may be attached to the display panel 110. The middle panel 160 may be attached to a rear surface of the display panel 110 by use of an adhesive member 172. The adhesive member 172 may be composed with a double-sided tape.

The middle panel 160 may be composed to be light weight. In addition to reinforcing the display panel 110, the middle panel 160 may help the display panel 110 radiating heat. For example, the middle panel 160 may include a spacer, interpositioned in between the two sheets, and the two sheets are disposed while being spaced apart in a predetermined distance from each other. The spacer may be composed with a plastic plate having a honeycomb structure or a plastic plate, having a crease structure in a shape of waves. The middle panel 160 may be provided with metallic material to effectively perform heat radiation.

Figure 14:
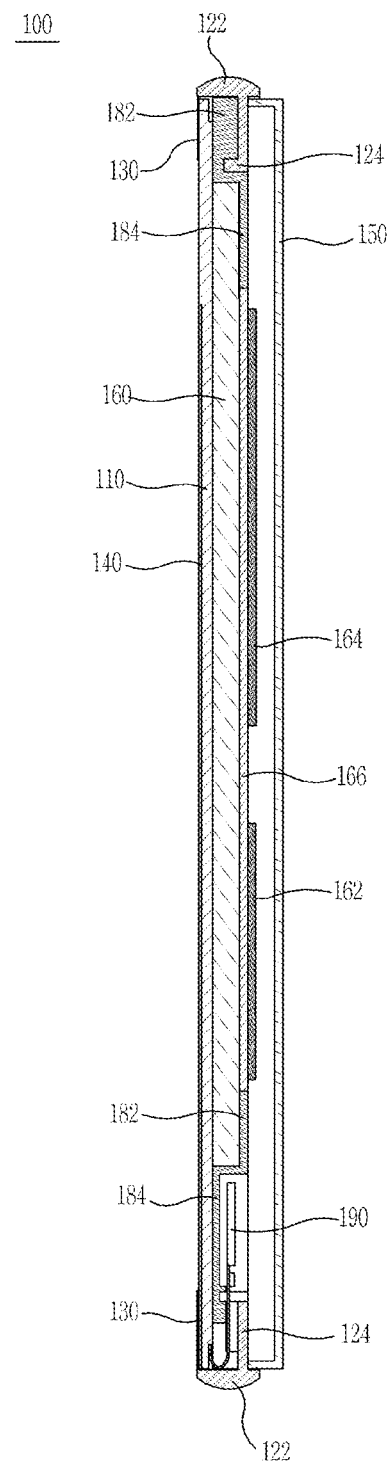
FIG. 14 is a cross-sectional view of the display device of FIG. 13.

As illustrated on FIG. 14, a rear of the middle panel 160 may be provided with at least one disposed printed circuit board. The printed circuit board is accommodated at a space in between the middle panel 160 and the rear cover 150.

At least one printed circuit board may include a main board 162, to supply an image signal to the display panel 110, and a power supply board 164, to supply power to the display panel 110. A rear of the middle panel 160 is provided with a coupled holder 166, and the main board 162 and the power supply board 164 may be mounted at the holder 166.

A bracket panel 180 may be provided in between the display panel 110 and the rear cover 150. The bracket panel 180 may be provided with aluminum material having a light weight and high durability.

The bracket panel 180 includes a first panel coupling unit 182 attached to the display panel 110, and a second panel coupling unit 184 attached to the middle panel 160. The first panel coupling unit 182 is attached from an outer side of the side surface of the middle panel 160, to reinforce the strength of the peripheral of the display panel 110. The second panel coupling unit 184 is disposed in between the middle panel 160 and the rear cover 150, to be attached to a rear surface of the middle panel 160.

The bracket panel 180, by use of an adhesive member 174, may be attached to the display panel 110 and the middle panel 160. The adhesive member 174 may be composed with a double-sided tape.

Figure 15:
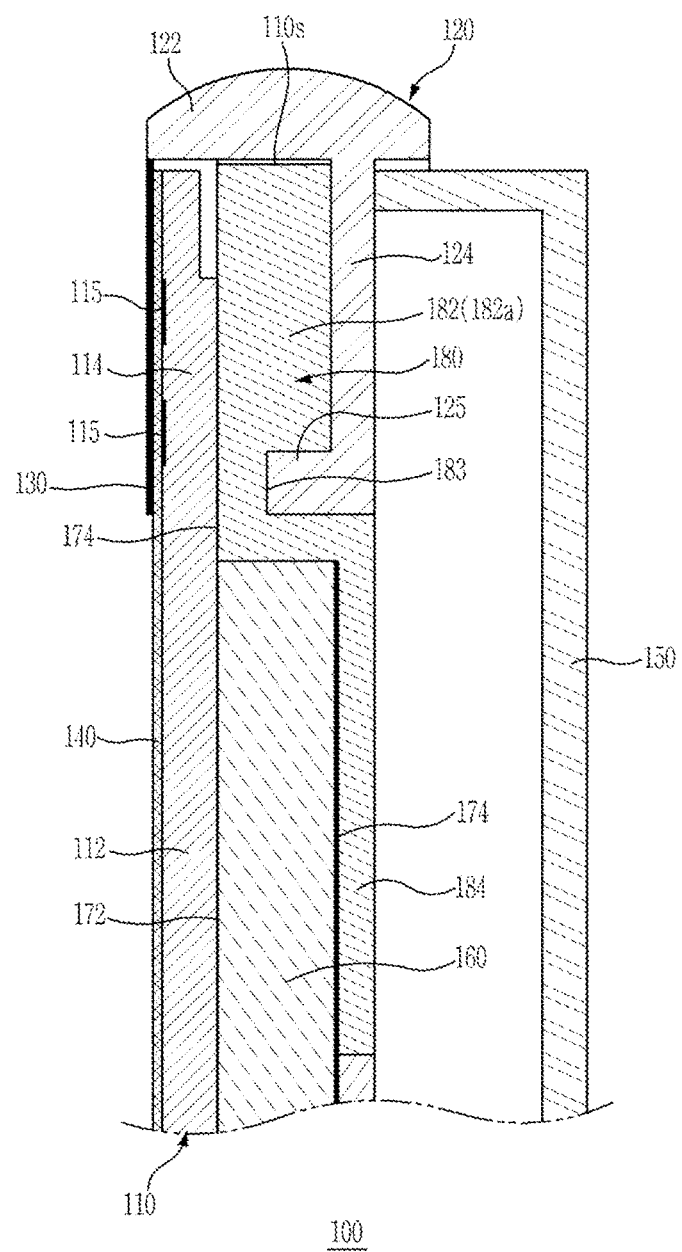
FIG. 15 is a cross-sectional view illustrating an upper portion of the display device of FIG. 13.

As illustrated on FIG. 15, a portion 182a of the first panel coupling unit 182 is disposed in between the display panel 110 and the support unit 124 of the side cover 120, and may be coupled to the support unit 124. The support unit 124 of the side cover 120 is provided with a coupling bump 125, protruded toward a front. A coupling groove 183 may be provided at the first panel coupling unit 182, such that the coupling bump 125 of the support unit 125 may be inserted into the coupling groove 183. Although not illustrated, the portion 182a of the first panel coupling unit 182 and the support unit 124 of the side cover 120 may be coupled to each other by use of a coupling member, such as a screw.

Figure 16:
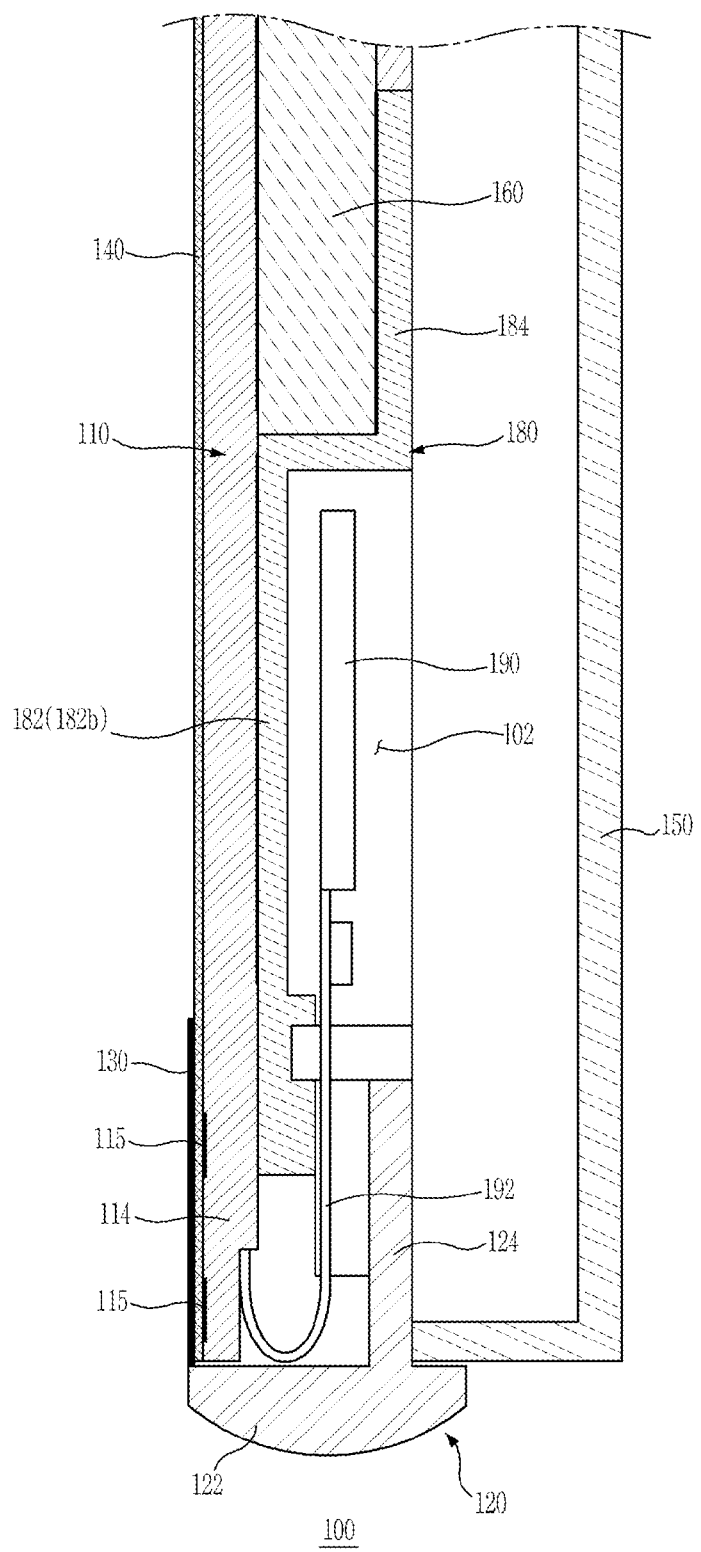
FIG. 16 is a cross-sectional view illustrating a lower portion of the display device of FIG. 13.

As illustrated on FIG. 16, a rear of the display panel 110 is provided with a printed circuit board 190, to drive the display panel 110. The printed circuit board 190 is electrically connected to the display panel 110 through a connecting film 192. In addition, the printed circuit board 190 may be connected to the main board 162 and the power supply board 164 through a cable (not shown).

A space is formed in between the other portion 182b of the first panel coupling unit 182 at the bracket panel 180 and the rear cover 150. The printed circuit board 190 is accommodated at the space 102.

Embodiments of the disclosure are not limited. For example, as shown in at least FIGS. 1-5 and 15-16, the peripheral unit 34 may comprise a peripheral frame, the support unit 31 may comprise a support frame, the first panel coupling unit 182 may comprise a first panel coupling portion, and the second panel coupling unit 184 may comprise a second panel coupling portion. Further, the peripheral unit 34, the support unit 31, the first panel coupling unit 182, and the second panel coupling unit 184 may comprise any hardware that would be within the knowledge of those skilled in the art.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display device, comprising:
   a display panel having a front surface and a rear surface;
   a supporting cover disposed at a rear of the display panel, the supporting cover comprising a through-hole extended in a longitudinal direction of the supporting cover;
   a driving board disposed between the display panel and the supporting cover; and
   a cable connected to the driving board, the cable being configured to extend via the through-hole and configured to supply an image signal to the display panel,
   wherein the driving board includes a printed circuit board and a flexible connection film connecting the display panel and the printed circuit board,
   wherein the flexible connection film has a first end portion and a second end portion,
   wherein the flexible connection film is bent between the rear surface of the display panel and the supporting cover so as to be disposed between the display panel and the supporting cover, the flexible connection film being attached to a rear portion of the display panel and the printed circuit board,
   wherein the first end portion of the flexible connection film is attached to the rear portion of the display panel, and
   wherein the flexible connection film extends from the first end portion attached to the rear portion of the display panel to the second end portion along the rear surface of the display panel.

2. The display device of claim 1, wherein the supporting cover is formed of tempered glass.

3. The display device of claim 1, wherein the supporting cover is formed with material having heat conductivity.

4. The display device of claim 1, further comprising:
   a power board disposed at a rear of the supporting cover and configured to supply power to the display panel.

5. The display device of claim 4, further comprising:
   an exterior cover configured to cover the driving board, the power board and the supporting cover.

6. The display device of claim 1, further comprising:
   a side support disposed at the rear of the display panel, the side support comprising at least one plate configured to reinforce the display panel.

7. The display device of claim 6, wherein the at least one plate of the side support comprises a plastic plate.

8. A display device, comprising:
   a display panel having a front surface and a rear surface;
   a supporting cover disposed at a rear of the display panel, the supporting cover comprising a through-hole extended in a longitudinal direction of the supporting cover;
   at least one printed circuit board disposed at a rear of the supporting cover;
   a circuit disposed between the display panel and the supporting cover;
   a cable connected to the circuit, the cable being configured to extend via the through-hole and configured to supply a signal to the display panel; and
   an exterior cover coupled to the supporting cover and configured to cover the at least one printed circuit board and the through-hole,
   wherein the circuit includes a printed circuit board and a flexible connection film connecting the display panel and the printed circuit board,
   wherein the flexible connection film has a first end portion and a second end portion, wherein the flexible connection film is bent between the rear surface of the display panel and the supporting cover so as to be disposed between the display panel and the supporting cover, the flexible connection film being attached to a rear portion of the display panel and the printed circuit board, wherein the first end portion of the flexible connection film is attached to the rear portion of the display panel, and wherein the flexible connection film extends from the first end portion attached to the rear portion of the display panel to the second end portion along the rear surface of the display panel.

9. The display device of claim 8, wherein the display panel comprises an organic light emitting diode panel.

10. The display device of claim 8, wherein the exterior cover comprises a first part and a second part, and the first part is extended upward from the second part.

11. The display device of claim 10, wherein a first end of the first part is connected to the second part and a second end of the first part is coupled to the through-hole.

12. The display device of claim 8, further comprising:
a side support disposed at the rear of the display panel, the side support comprising at least one plate configured to reinforce the display panel.

13. The display device of claim 12, wherein the at least one plate of the side support comprises a plastic plate.

14. The display device of claim 1, wherein the driving board comprises a driving integrated circuit.

15. The display device of claim 1, wherein the flexible connection film has the second end portion connected to the printed circuit board and a middle portion on which a chip is mounted.

16. The display device of claim 6, wherein the side support is attached to the rear of the display panel by use of an adhesive member.

17. The display device of claim 16, wherein the adhesive member comprises a double-sided tape.

18. The display device of claim 8, wherein the circuit comprises a driving integrated circuit.

19. The display device of claim 12, wherein the side support is attached to the rear of the display panel by use of an adhesive member.

20. The display device of claim 19, wherein the adhesive member comprises a double-sided tape.

21. The display device of claim 1, wherein the cable is connected to a connector provided at the driving board.

22. The display device of claim 1, further comprising:
a leg unit supporting the display device.

23. The display device of claim 1, wherein the through-hole is on a central planar portion of the supporting cover.

24. The display device of claim 8, wherein the supporting cover is formed of tempered glass.

25. The display device of claim 1, wherein the flexible connection film is bent upward.

26. The display device of claim 8, wherein the flexible connection film is bent upward.

27. A display device, comprising:
a display panel having a front surface and a rear surface;
a supporting cover disposed at a rear of the display panel, the supporting cover comprising a through-hole extended in a longitudinal direction of the supporting cover;
at least one printed circuit board disposed at a rear of the supporting cover;
a film disposed between the display panel and the supporting cover, at least a portion of the film being bent, and configured to be connected to a circuit and a rear portion of the display panel, wherein the film has a first end portion and a second end portion, the film being bent between the rear surface of the display panel and the supporting cover;
a cable connected to the circuit, the cable being configured to extend via the through-hole and configured to connect the at least one printed circuit board and the circuit,
wherein the first end portion of the film is attached to the rear portion of the display panel, and
wherein the film extends from the first end portion attached to the rear portion of the display panel to the second end portion along the rear surface of the display panel.

28. The display device of claim 27, wherein the supporting cover is formed of tempered glass.

29. The display device of claim 27, wherein the supporting cover is formed with material having high heat conductivity.

30. The display device of claim 27, further comprising:
a power board disposed at a rear of the supporting cover and configured to supply power to the display panel; and
an exterior cover configured to cover the printed circuit board, the power board and the supporting cover.

31. The display device of claim 1, further comprising a panel coupling unit,
wherein a bent distal end of the flexible connection film is bent around the panel coupling unit.

32. The display device of claim 5, wherein the exterior cover covers at least a portion of a rear portion of the supporting cover.

33. The display device of claim 8, wherein the exterior cover covers at least a portion of a rear portion of the supporting cover.

34. The display device of claim 30, wherein the exterior cover covers at least a portion of a rear portion of the supporting cover.

35. The display device of claim 1, wherein the flexible connection film is attached to a portion of the printed circuit board.

36. The display device of claim 8, wherein the flexible connection film is attached to a portion of the printed circuit board.

37. The display device of claim 27, wherein the film is attached to a portion of the circuit.

38. The display device of claim 1, wherein the display panel includes a front side substrate and a rear side substrate,
the flexible connection film is connected to an electrode protruded from a cell provided between the front side substrate and the rear side substrate, and
the flexible connection film has one end connected to the printed circuit board and a middle portion on which a chip is mounted.

39. The display device of claim 1, wherein the display panel includes a step portion at a rear lower side of the display panel, a thickness of the step portion being smaller than a thickness of other portions of the display panel,
the flexible connection film has the first end portion coupled to the step portion, the second end portion coupled to the printed circuit board, and a middle portion on which a chip is mounted.

40. The display device of claim 8, wherein the flexible connection film has the second end portion connected to the printed circuit board and a middle portion on which a chip is mounted.

41. The display device of claim 8, wherein the display panel includes a front side substrate and a rear side substrate, the flexible connection film is connected to an electrode protruded from a cell provided between the front side substrate and the rear side substrate, and the flexible connection film has one end connected to the printed circuit board and a middle portion on which a chip is mounted.

42. The display device of claim 8, wherein the display panel includes a step portion at a rear lower side of the display panel, a thickness of the step portion being smaller than a thickness of other portions of the display panel, the flexible connection film has the first end portion coupled to the step portion, the second end portion coupled to the printed circuit board, and a middle portion on which a chip is mounted.

43. The display device of claim 27, wherein the film has the second end portion connected to the circuit and a middle portion on which a chip is mounted.

44. The display device of claim 27, wherein the display panel includes a front side substrate and a rear side substrate, the film is connected to an electrode protruded from a cell provided between the front side substrate and the rear side substrate, and the film has one end connected to the circuit and a middle portion on which a chip is mounted.

45. The display device of claim 27, wherein the display panel includes a step portion at a rear lower side of the display panel, a thickness of the step portion being smaller than a thickness of other portions of the display panel, the film has the first end portion coupled to the step portion, the second end portion coupled to the circuit, and a middle portion on which a chip is mounted.

46. A display device, comprising:

an organic light emitting diode (OLED) panel having a front surface and a rear surface;

a cover disposed at a rear of the OLED panel and comprising a through-hole extended in a longitudinal direction of the cover; and a board disposed between the OLED panel and the cover and comprising a printed circuit board and a flexible connection film connecting the OLED panel and the printed circuit board, wherein the flexible connection film has a first end portion and a second end portion, the flexible connection film being bent between the rear surface of the OLED panel and the cover, wherein the flexible connection film is bent to be connected to a rear portion of the OLED panel and the printed circuit board, wherein the first end portion of the flexible connection film is attached to the rear portion of the OLED panel, and wherein the flexible connection film extends from the first end portion attached to the rear portion of the OLED panel to the second end portion along the rear surface of the OLED panel.

47. The display device of claim 46, further comprising:

a leg unit supporting the display device and coupled to a rear portion of the cover.

48. The display device of claim 46, wherein the flexible connection film has the second end portion connected to the printed circuit board and a middle portion on which a chip is mounted.

49. The display device of claim 46, wherein the OLED panel includes a front side substrate and a rear side substrate, the flexible connection film is connected to an electrode protruded from a cell provided between the front side substrate and the rear side substrate, and the flexible connection film has one end connected to the printed circuit board and a middle portion on which a chip is mounted.

50. The display device of claim 46, wherein the OLED panel includes a step portion at a rear lower side of the OLED panel, a thickness of the step portion being smaller than a thickness of other portions of the OLED panel, the flexible connection film has the first end portion coupled to the step portion, the second end portion coupled to the printed circuit board, and a middle portion on which a chip is mounted.

51. The display device of claim 1, wherein the flexible connection film has a front surface and a rear surface, the front surface of the flexible connection film facing the rear surface of the display panel, wherein a portion of the front surface of the flexible connection film is attached to the rear surface of the display panel of the rear portion of the display panel.

52. The display device of claim 8, wherein the flexible connection film includes a front surface and a rear surface, the front surface of the flexible connection film facing the rear surface of the display panel, wherein a portion of the front surface of the flexible connection film is attached to the rear surface of the display panel of the rear portion of the display panel.

53. The display device of claim 27, wherein the film includes a front surface and a rear surface, the front surface of the film facing the rear surface of the display panel, wherein a portion of the front surface of the film is attached to the rear surface of the display panel of the rear portion of the display panel.

54. The display device of claim 46, wherein the flexible connection film includes a front surface and a rear surface, the front surface of the flexible connection film facing the rear surface of the OLED panel, wherein a portion of the front surface of the flexible connection film is attached to the rear surface of the OLED panel of the rear portion of the OLED panel.

* * * * *